Oct. 9, 1962 C. VAN DER LELY ET AL 3,057,144
RAKE WHEELS
Filed April 27, 1959 3 Sheets-Sheet 1

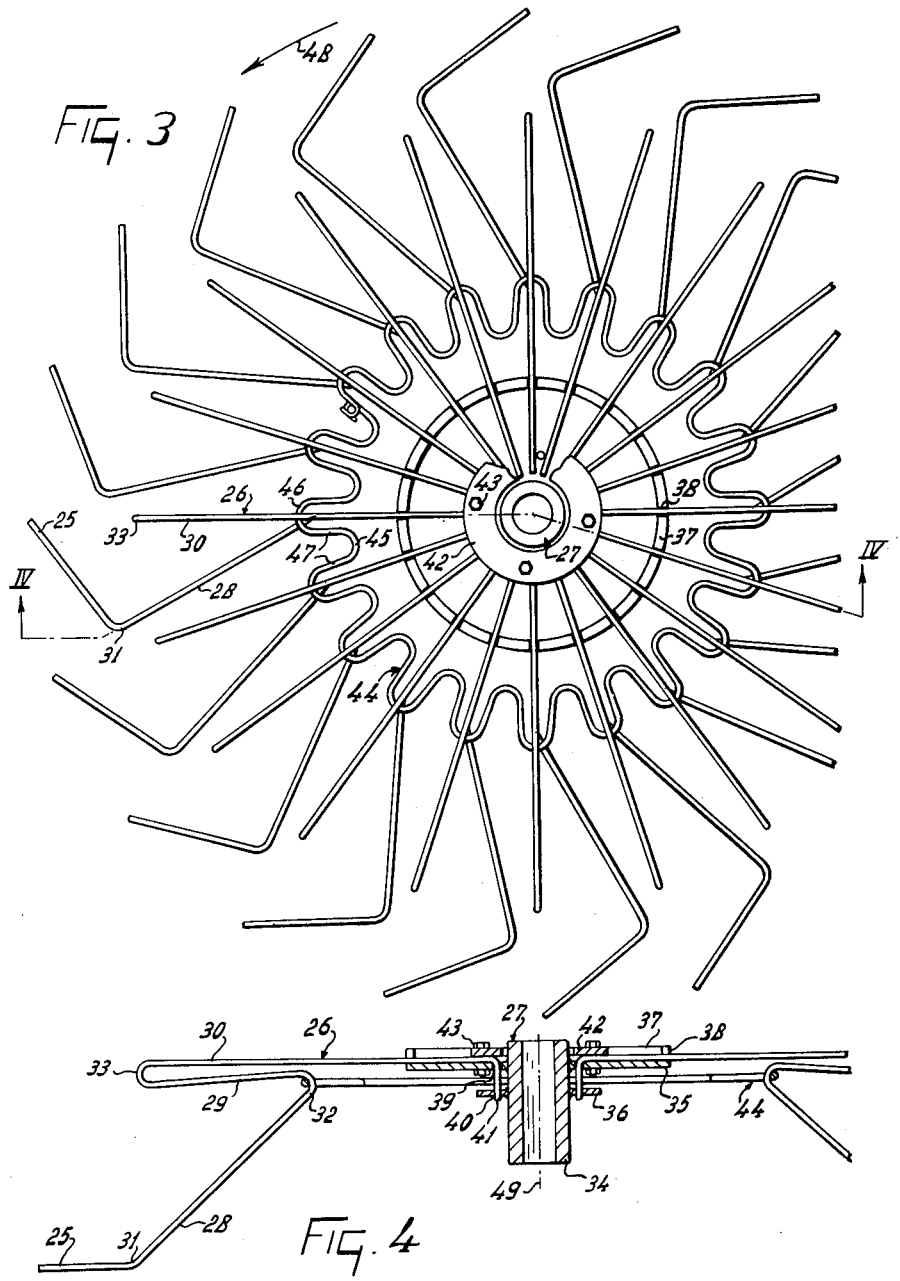

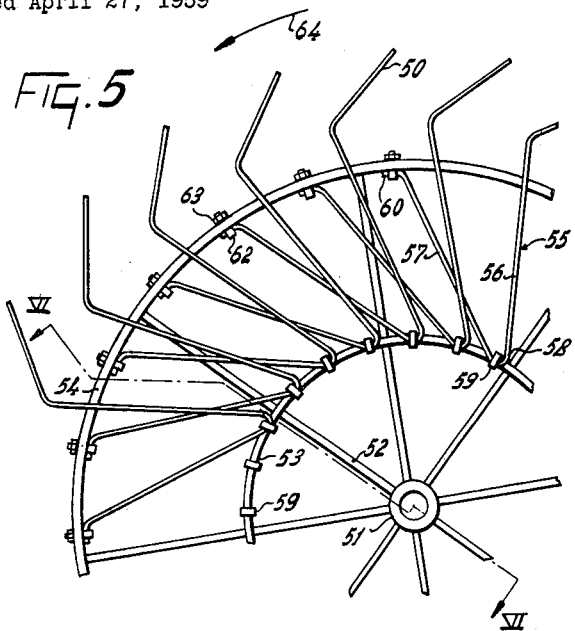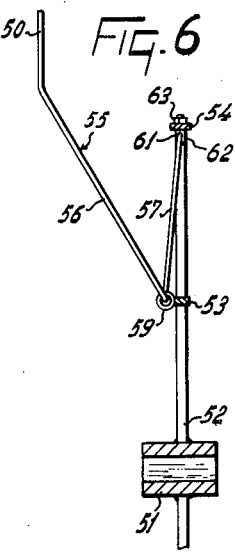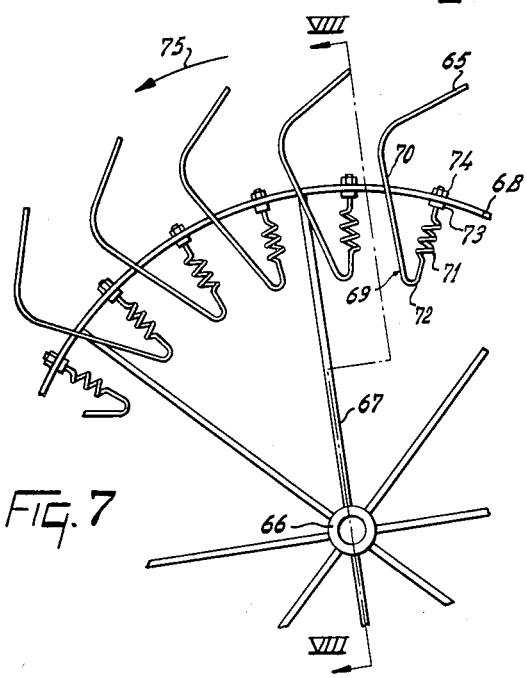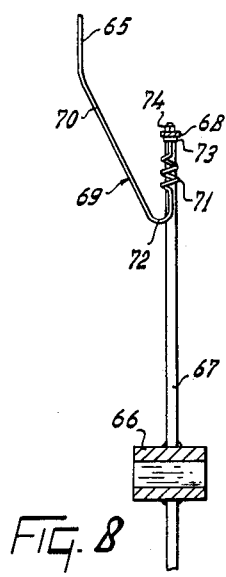

United States Patent Office

3,057,144
Patented Oct. 9, 1962

3,057,144
RAKE WHEELS
Cornelis van der Lely and Ary van der Lely, Maasland, Netherlands, assignors to C. van der Lely N.V., Maasland, Netherlands, a Dutch limited liability company of the Netherlands
Filed Apr. 27, 1959, Ser. No. 809,020
Claims priority, application Netherlands Apr. 26, 1958
20 Claims. (Cl. 56—377)

This invention relates to rake wheels having circumferential resilient tines.

In accordance with the invention there is provided a rake wheel having circumferential resilient tines, wherein a tine is connected in the wheel by a connecting member comprising a first portion which connects with the tine and then extends in a direction towards the axis of rotation of the wheel, and a second portion which connects with the first portion and then extends in a direction away from said axis, said first portion, at a location near its connection with the tine, being displaceable in the direction of said axis.

With the wheel just defined, the tines are readily capable of deflecting so that a large number of tines may be simultaneously in contact with the ground, whereby a large working width for the wheel is obtained. Moreover, the tines can individually deflect to accommodate unevennesses in the ground.

Figure 1:
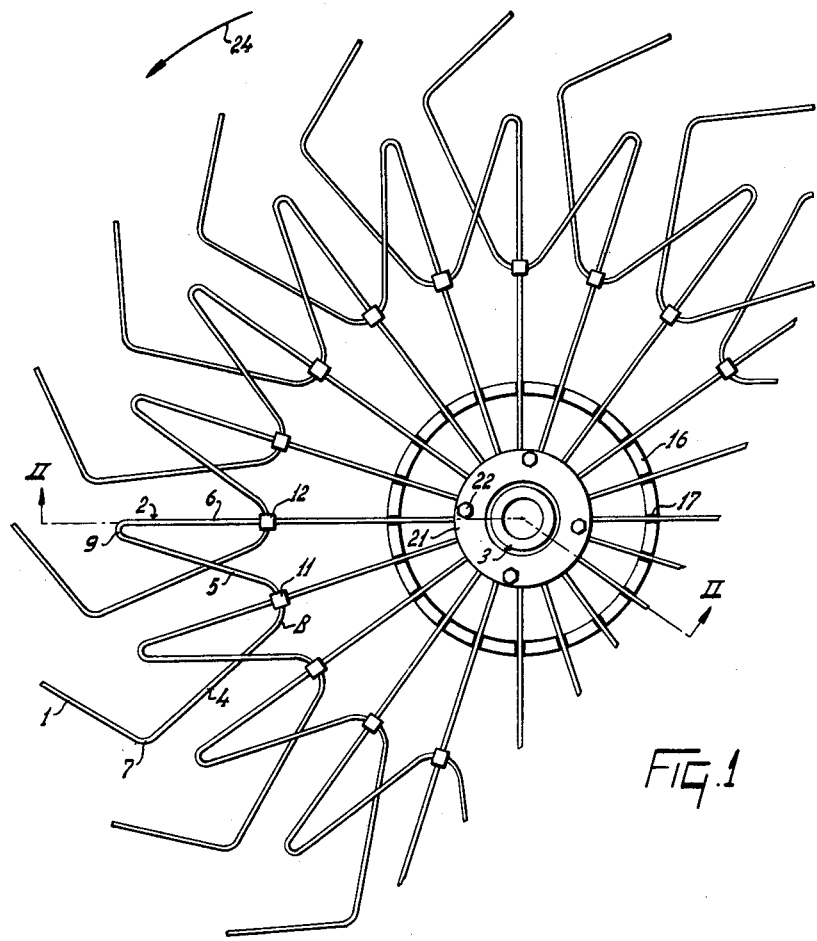
Figure 2:
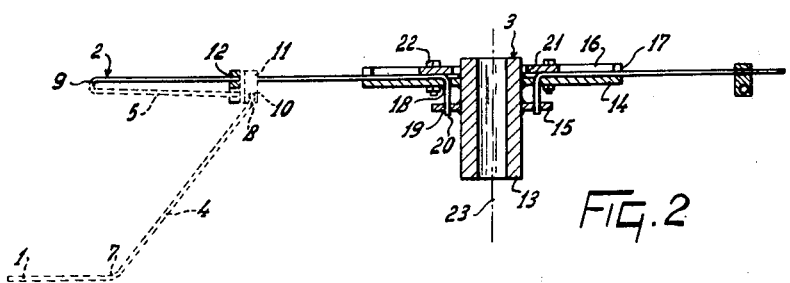

For a better understanding of the invention and to show how the same may be carried into effect, reference will now be made to the accompanying drawings in which:

FIGURE 1 is a front view, partly broken away, of a first embodiment of a rake wheel according to the invention, FIGURE 2 is a sectional view taken on the line II—II of FIGURE 1, FIGURE 3 is a front view, partly broken away, of a second embodiment of a rake wheel according to the invention, FIGURE 4 is a sectional view taken on the line IV—IV of FIGURE 3, FIGURE 5 is a front view of a part of a third embodiment, FIGURE 6 is a sectional view taken on the line VI—VI of FIGURE 5, FIGURE 7 is a front view of a part of a fourth embodiment of a rake wheel according to the invention, and FIGURE 8 is a sectional view taken on the line VIII—VIII of FIGURE 7.

Referring first to FIGURES 1 and 2, the rake wheel is provided at its circumference with resilient tines 1, which are secured to the hub 3 of the rake wheel by means of a connecting member 2. Each connecting member 2 consists of a first portion 4, a second portion 5 and a third portion 6. The portion 4 constitutes a tine support, which connects with the tine and extends away therefrom towards the hub 3. The portion 5 constitutes a torsion bar, which connects with the portion 4 and which extends from such connection in a direction away from the hub. That end of the torsion bar 5 remote from the hub, connects with the portion 6, which constitutes a spoke-like portion and which is radial to the axis of rotation of the wheel.

Each connecting member 2 and its tine 1 are made from one piece of bent steel wire, the support 4 and the tine 1 being connected by a bent part 7, so that the tine 1 and the support 4 are inclined to each other. The support 4 and the torsion bar 5 are connected by a bent part 8, and the torsion bar 5 and the spoke-like portion 6 merge via a bent part 9. The bent part 8 formed in the connecting member of one tine, passes over the spoke-like portion formed in the connecting member of a further tine, and these two different connecting members are coupled to each other by a coupling element 11. The bent part 8 of a tine extends through a hole 10 in the coupling element 11, whereas the spoke-like portion 6 of the same tine extends through a hole 12A in another coupling element 12. In FIGURE 2 the section has been drawn to show on the left-hand side only the one complete tine and connecting member, the tine lying in front of the section line.

The coupling element 11 has also been shown, although this also lies in front of the section line. The holes 10 and 12A are so large that the bent part 8 and the portion 6 are capable of turning about their center lines in these holes, the element 11 being free to move along the spoke-like portion on which it is seated. The coupling elements 11 and 12 are identical in form and each possesses a hole 12A and a hole 10.

The hub 3, to which the free end of a spoke-like portion 6 is secured, consists of a sleeve 13 carrying large and small flanges 14 and 15. The flange 14 has a rim 16 formed with slots 17. Both flanges have registering pairs of holes 18 and 19, in which are inserted the bent-over ends 20 of the spoke-like portions 6. The spoke-like portion are also located one in each slot 17 of the rim 16, so that the bent-over ends 20 cannot turn in the holes 18 and 19. The bent-over ends 20 are held in the holes 18 and 19 by a ring 21 secured to the flange 14 by four bolts 22.

The connecting member 2 of each tine is bent so that the tines are spaced from the plane containing the spoke-like portions 6, which plane is at right angles to the rotational axis 23 of the rake wheel.

The torsion bars 5 are located substantially in the same plane as the spoke-like portions 6. The tines 1 are also located in a plane at right angles to the rotational axis 23, the supports 4 being inclined to this plane. Because of this shape of each connecting member 2, the tines 1 are capable of deflecting very readily when meeting unevennesses in the ground, and also a plurality of tines can simultaneously engage the ground, so that the working width of the rake wheel is great while the tines are maintained in positions which insure that there is an effective raking action.

In the employment of the rake wheel it rotates in the direction of the arrow 24, the tines 1 thus being oriented backwardly whereby the crop engaged thereby may be readily shed from the rising side of the rake wheel. The supports 4, from their connections with the tines, extend also backwardly with reference to the direction of rotation 24, as also do the torsion bars 5, considered in the direction from 8 to 9.

The second embodiment of the rake wheel is shown in FIGURES 3 and 4 and is very similar to the rake wheel shown in FIGURES 1 and 2. As shown in FIGURES 3 and 4, there are peripheral tines 25 secured to the hub 27 by connecting members 26. Each connecting member 26 consists of a first portion 28, a second portion 29 and a third portion 30, which portions, together with their tine 25, are made from one piece of resilient steel wire. The portions 28, 29 and 30 and the tine 25 connect with each other via bent parts 31, 32 and 33. Each bent part 33 is spaced from the hub 27 by a distance which is about twice the distance of each bent part 32 from the hub. The hub 27 is formed in the same manner as the hub 3 of the preceding embodiment, and has a sleeve 34 with two flanges 35 and 36. The flange 35 has a rim 37 with slots 38. Near the sleeve 34 the flanges 35 and 36 have pairs of registering holes 39 and 40, in which the bent-over ends 41 of the spoke-like portion 30 are inserted. These bent-over ends 41 are held in the holes 39 and 40 by a ring 42, which is secured to the flange 35 by bolts 43.

The tines 25, which are connected with the hub 27 only by their connecting members 26, are loosely coupled to each other by a circularly extending sinuous element 44, which lies in the bent parts 32 between the supports 28 and the torsion bars 29. This element is not connected with the wheel in any other way, so that it is quite free of the hub. The element 44 has curved crests 45 and 46, between which there are straight portions 47 lying substantially radial to the hub 27.

As in the preceding embodiment, the tines 25 are spaced from the plane in which the spoke-like portions 30 are located and which is at right angles to the rotational axis 49 of the rake wheel. Also in the embodiment the tines 25 from root to tip are oriented backwardly with reference to their direction of rotation (indicated by the arrow 48) and point in a direction away from the hub 27. The first portions or supports 28 extend from the roots of the tines in a direction opposite that of their rotation. In contra-distinction to the preceding embodiment the second portions or torsion bars 29 are radial to the hub, while they are approximately parallel to the third spoke-like portions 30. Also in this embodiment the torsion bars 29 and the spoke-like portions 30 are located approximately in the same plane. The tines 25 are also located in a plane which is at right angles to the axis of rotation 49, but which is spaced from the plane in which the portions 30 are located.

Since there is no felloe in the rake wheels shown in FIGURES 1 to 4, a very flexible rake wheel is obtained, which readily accommodates the unevennesses of the ground and can be of a light weight, while its manufacture can be readily carried out.

Referring now to FIGURES 5 and 6, the rake wheel here shown has circumferential tines 50 and a hub 51, which is connected with two felloes 53 and 54 by spokes 52. The felloe 54 is spaced from the hub 51 by a distance which is approximately twice that of the felloe 53 from hub 51. Each tine 50 is connected with the rake wheel by means of a connecting member 55. The connecting member 55 consists of a first portion 56 and a second portion 57, which portions, together with the tine 50 are made from one piece of bent material. The portion 56, which constitutes a support, connects, via a bent part 58, with the portion 57, which constitutes a torsion bar. Each bent part 58 passes through an eye 59 carried on the felloe 53. Each torsion bar 57 which extends from the part 58 to the felloe 54, is anchored to the felloe 54 by the bent-over end 60, which is inserted in a hole 61 in a stud 62. The stud 62 passes through the felloe 54 from the inner side thereof and is secured by a nut 63 on the outer side of the felloe 54. The end 60 of the torsion bar 57 is thus held fast against the inner side of the felloe 54. The torsion bars 57 in this embodiment are located substantially in the plane of the rake wheel formed by the spokes 52 and the felloes 53 and 54. Each support is shaped such that its tine 50 is spaced from the wheel plane, the support 56 being inclined to such plane. The tines 50 from root to tip extend backwardly with respect to the direction of rotation (shown by the arrow 64) of the rake wheel, the supports 56 being oppositely inclined. The torsion bars 57 extend from the bent parts 59 in the direction of rotation 64, so that the torsion bars extend in a different direction as compared with the two preceding embodiments.

Referring now to FIGURES 7 and 8, the rake wheel there shown has peripheral tines 65 and a hub 66, which is connected with a felloe 68 by spokes 67. Each tine 65 is connected with the felloe 68 by a connecting member 69. The connecting member 69 consists of a first portion or support 70, and a second portion 71, these portions connecting with each other via a bent part 72. The support 70 extends from the tine 65 in the direction of the hub, whereas the second portion 71 extends from the support 69 in a direction away from the hub. The second portion 71 is constructed in the form of a helical spring, and has near its free end a fixed washer 73. The part beyond the washer 73 passes through the felloe 68 and, outside this felloe, is engaged by a nut 74. Thus the connecting member 69 is secured to the felloe 68 by clamping the felloe 68 between the washer 73 and the nut 74. Also in this embodiment the tines from root to tip extend backwardly with reference to the direction of rotation (indicated by the arrow 75), the tines being spaced from the plane which contains the spokes 67 and the felloe 68, and in which plane the helical springs 71 are located.

It will be noted that all the rake wheels described above have tines which are connected with the rake wheels by means of a support which extends from the tine towards the hub of the rake wheel, while this support merges into a portion adapted to be torsionally stressed (such as the torsion bar 5 of FIGURE 1 or the spring 71 of FIGURE 7), the support itself being either free of positive restraints, or positively restrained only at its end nearest the hub, as for example in the embodiments shown in FIGURES 1 to 6. This way of fastening a tine in the rake wheels permits the tines, and the portions of the supports secured to them, to deflect substantially away from their undeflected positions, the tines still being in satisfactory positions for raking.

During their deflection the tines can move away from the plane containing the portions adapted to be torsionally stressed, the tines with their supports turning about the axes of such portions.

Since in FIGURES 5 to 8 the portions adapted to be torsionally stressed extend from the supports in a direction away from the hub and are secured to a felloe, the rake wheel obtained may have a more rigid structure than would be obtained if the torsion bars were connected like spokes to the hub. This more rigid structure may extend out from the hub to a degree such that only the tines are located beyond the perimeter of this structure, the supports being located inside this portion. The rake wheels may be employed so that the more rigid structure, formed by the spoke-like portions or felloe with spokes, encounters the major quantity of the crop and works it, whereas the tines engage and work the crop located near the ground surface, so that the tines are not loaded by the major quantity of the crop.

By arranging the torsion bars to extend from the tine supports in directions away from the hub, the advantage is obtained that the diameter of the rake wheels may be kept small, while a very flexible tine mounting is obtained.

What we claim is:

1. A rake wheel comprising a central part defining an axis of rotation, a plurality of circumferential resilient tines, a connecting member connecting each tine to the central part of the rake wheel, the connecting member comprising at least two portions, said portions including substantially oblong first and second portions, said first portion being connected and inclined to the tine and extending from the tine such that the end of said first portion connected to the tine lies at a greater distance from said central part than the other end thereof which is connected to said substantially oblong second portion, the connection of said first portion with the tine being free from support and therefore being deflectable with respect to the rake wheel, said second portion extending such that the end thereof connected to said first portion lies at a smaller distance from said central part than the other end thereof which is mounted in the wheel.

2. A rake wheel as claimed in claim 1, wherein the first and the second portions are of one piece of wire, the first portion constituting a support for the tine and the second portion an element for torsionally opposing deflection of the tine.

3. A rake wheel as claimed in preceding claim 1, wherein the tines and the second portions associated therewith are located in planes which are substantially perpendicular to said axis.

4. A rake wheel as claimed in claim 1, wherein each first portion is inclined to a plane which contains the associated tine and which is perpendicular to said axis.

5. A rake wheel as claimed in claim 1, having a normal direction of rotation and wherein each first portion extends from the associated second portion in a direction which is forwardly inclined with respect to said direction of rotation of the wheel, each tine extends backwardly with respect to said direction.

6. A rake wheel as claimed in claim 1, wherein the support means includes a felloe and each second portion is connected with said felloe.

7. A rake wheel as claimed in claim 6, wherein each second portion is a helical spring.

8. A rake wheel as claimed in claim 6, comprising a second felloe supporting the junctions of the first and second portions.

9. A rake wheel as claimed in claim 1, wherein each connecting member includes a third portion, which connects with the associated second portion and extends towards said axis.

10. A rake wheel as claimed in claim 9, wherein the portions of each connecting member are of one piece of wire, the third portion being a spoke-like portion.

11. A rake wheel as claimed in claim 9, wherein each second portion and the associated third portion extend substantially parallel to each other.

12. A rake wheel as claimed in claim 9, wherein each second portion extends from the associated third portion in a direction which is forwardly inclined with respect to the intended direction of rotation of the rake wheel.

13. A rake wheel as claimed in claim 9, wherein the connection between the first portion and the second portion of a connecting member is located near to the third portion of an adjacent connecting member.

14. A rake wheel as claimed in claim 13, wherein said connection is coupled to the third portion of said adjacent connecting member.

15. A rake wheel as claimed in claim 14, comprising a coupler and wherein the coupling is effected with said coupler which is slidable along at least one of the portions it couples, the coupled portions being inclined to one another.

16. A rake wheel as claimed in claim 9, wherein the distance of the connection between the second portion and the third portion from said axis is about twice the distance of the connection between the first portion and the second portion from said axis.

17. A rake wheel as claimed in claim 9, comprising and wherein the tines and their connecting members are connected with each other beyond the circumference of the support means by a circularly extending element which is free of the support means.

18. A rake wheel as claimed in claim 17, wherein said element consists of a sinuous piece of wire, which engages the connections between the first portions and the second portions.

19. A rake wheel as claimed in claim 9, wherein the support means includes a rim and the third portions are secured to the support means and are located in slots provided in the rim.

20. A rake wheel as claimed in claim 19, comprising two annular members and wherein said third portions are held in the slots by the ends of the third portions being clamped between said two annular members which are approximately at right angles to the axis of rotation of the rake wheel.

References Cited in the file of this patent

UNITED STATES PATENTS

| | | |
|---|---|---|
| 2,588,599 | Winter | Mar. 11, 1952 |
| 2,670,588 | Plant | Mar. 2, 1954 |
| 2,683,345 | Meyer | July 13, 1954 |

FOREIGN PATENTS

| | | |
|---|---|---|
| 532,469 | Belgium | Oct. 30, 1954 |